(12) United States Patent
Finseth et al.

(10) Patent No.: US 6,271,840 B1
(45) Date of Patent: Aug. 7, 2001

(54) GRAPHICAL SEARCH ENGINE VISUAL INDEX

(76) Inventors: James Lee Finseth, 926 1st St., #2, Hermosa Beach, CA (US) 90254; Jerry Hermel, 5333 Wortser Ave., Sherman Oaks, CA (US) 91401; Bryan F. Pelz, 3854 N. Orchid La., #D, Calabasas, CA (US) 91301

(*) Notice: Subject to any disclaimer, the term of this patent is extended or adjusted under 35 U.S.C. 154(b) by 0 days.

(21) Appl. No.: 09/160,633

(22) Filed: Sep. 24, 1998

(51) Int. Cl.[7] .................................................. G06F 3/14
(52) U.S. Cl. ........................ 345/349; 707/513; 345/357
(58) Field of Search ................................... 345/968, 348, 345/349, 357; 707/3, 104, 501, 4, 513

(56) References Cited

U.S. PATENT DOCUMENTS

| | | | |
|---|---|---|---|
| 5,193,056 | 3/1993 | Boes | 364/408 |
| 5,721,851 * | 2/1998 | Cline | 395/349 |
| 5,761,655 * | 6/1998 | Hoffman | 707/4 |
| 6,070,176 * | 5/2000 | Downs | 707/513 |

* cited by examiner

*Primary Examiner*—John Cabeca
*Assistant Examiner*—Michael May
(74) *Attorney, Agent, or Firm*—Cislo & Thomas, LLP

(57) ABSTRACT

A visual index method provides graphical output from search engine results or other URL lists. Search engine results or a list of URLs are passed to a web crawler that retrieves the web page and other media information present at the associated URL. The web crawler then passes this information to a page renderer which also receives image scale and format information regarding the web pages present at the URLs. The graphical information as well as other media information is then rendered into a reduced graphical form so that the page may be summarily reviewed by the user. Media, visual, or other information may also be downwardly scaled as appropriate or rendered in its original as appropriate (such as with audio data streams). A variety of convenient formats allows the user to quickly and readily scan the presentation at the URL web pages or other data present. Image maps associated with the reduced images may also provide hyperlink access to the linked web page and/or multimedia allowing the links present on the web page in its original to be accessed through the reduced image provided by the web page renderer.

15 Claims, 4 Drawing Sheets

GRAPHICAL SEARCH ENGINE VISUAL INDEX

BACKGROUND OF THE INVENTION

1. Field of the Invention

This invention relates to Internet web browsers and search engine output, and more particularly to a visual Internet search engine results index or summary that enables faster perusal of search engine output on both a hyperlink and graphical level.

2. Description of the Related Art

The meteoric rise of Internet use reveals the demand for information from the personal and trivial to the specifically technical and even vital. The Internet is the name given the worldwide network of computers available for public access that provides email, FTP, telnet, and web page access. As used herein, the term "Internet" refers to both this worldwide network of computers and any network of two or more computers supporting browsing. "Web pages" is the shorthand term given to Internet computer files available for browsing on both a text and graphics basis. Browsing of such web pages provides an enhanced user experience as hyperlinks, or web page entries, leading to other web pages or other Internet resources allow users to obtain additional information on subjects associated with the web page currently being viewed. One of the first browsers was named MOSAIC and was developed by Mark Andreeson while at the National Center for Supercomputing Applications at the University of Illinois at Urbana-Champaign. Internet activity, and particularly Internet commerce, are of particular interest at this point due to relevant commercial aspects.

With the rise of the internet, an Internet connection (including those by telephone) becomes a link to the sum total of world civilization available electronically and made accessible by research, academic, and governmental institutions. Geography becomes much less of a limitation to the accessibility of information than does bandwidth. Any form of electronic communication can carry Internet information provided the user and the server have compatible modems or other interface devices.

With such a vast reservoir of information available to those accessing the Internet, it has become a difficult question as to how to find pertinent information on a textual search basis. Logic is not currently available that allows computers to derive meaning from the text files or other data that they store in their memory. Consequently, literal string searches are the only manner in which information is generally retrieved or accessed on the Internet. Such retrieval often includes the use of search engines such as ALTAVISTA, LYCOS, INFOSEEK, EXCITE, as well as hierarchically ordered lists, including YAHOO!

One of the great drawbacks of current search engines is the output that they provide to the user. Often, such results are in the form of a list of hyperlinks with a cursory, if not cryptic, excerpt of initial text present on the web page. Few, if any, search engine interfaces provide means by which to gauge graphically the contents of the web page. Such review or perusal of some summary form of a web page, even if cursory, provides a significant amount of information as the form in which graphical information is presented often indicates to a significant degree its content.

For example, professional web pages often have a very polished look and can be discriminated at a variety of levels of resolution. The use of marginal framing on the left hand side is a currently popular technique by which access to the entire web presence of an organization can be delivered throughout all of its web pages. However, hobbyist or personal pages have a different look in general, often highlighting the subject matter most pertinent to the designer of such web pages. For example, the American Kennel Club might have a web page highlighting figures of canines that would be easily distinguishable at almost any level of resolution from an entire computer screen down to a miniature thumbnail summary of the first web page screen. Well-recognized logos or the like would also stand out in order to provide the user a means by which web pages could be evaluated quickly and either discarded or marked mentally or otherwise for future and/or closer review.

As current search engines do not provide such an interface, and as such an interface is highly desirable in order to quickly filter through the vast information available from the simplest of searches, it would be of significant advantage and development in the art to provide such an interface.

Additionally, greater advantage could also be provided by allowing such an interface to reside either on the server side of an Internet connection or on the client or browser side thereto.

SUMMARY OF THE INVENTION

The present invention remedies many of the shortcomings of current generation browsers by providing means by which thumbnail or other representational graphic information can accompany hyperlinks that result at the end of a search engine search. The present invention provides graphical summary information in a variety of user-friendly formats that greatly enhances the ability to review search engine results or other associated results having a plurality or a list of uniform/universal resource locators (URLs).

Initially, one or more URLs are passed to a web crawler that serves as an automatic process by which the URLs and all associated media are retrieved. These results of the URL retrieval requests are then passed to a page renderer that secures image scale and format information either from the source system/process, or otherwise. The page renderer then transmits as output reduced images of the web pages associated with the URLs as well as links to such URLs. The output is transmitted to a destination system, or process, such as a browser user interface or the like. In some embodiments, the page renderer may provide its own formatted output or, alternatively may leave that to the browser user interface.

In an alternative embodiment, the reduced image may carry with it an image map of clickable areas within the web page that correspond to similar areas inside the reduced image. Algorithms directed towards resolution of the reduced image and the fineness with which a user could manipulate a mouse may discriminate between closely-situated hyperlinks so that screen information could be accessed directly from the reduced image without difficulty.

By providing a list of hyperlinks as well as graphical representational of reduced images of the web pages associated with the hyperlink list, the present invention provides enhanced means by which vast amounts of Internet web page information can be delivered to the user. It then becomes an easier task for the user to discriminate between those links that are of interest and those links which are not based upon the summary graphical provided by the web page renderer.

Another advantage arising through the use of the present invention is the ability to compare several web pages simultaneously. As the data associated with such web pages is rendered by the present invention into a smaller size. Several of such rendered web pages can be displayed simultaneously on one computer screen, allowing rapid and convenient comparison and perusal.

OBJECTS OF THE INVENTION

It is an object of the present invention to provide a better and quicker review of search engine results and/or URL list information.

It is another object of the present invention to provide quicker review of search engine results by providing a graphical web page summary in conjunction with the hyperlink associated with the web page.

It is yet another object of the present invention to provide quick and summary graphical review of search engine results and the like by providing URL-handling processes that can reside, at least in part, on either the server or the client of an Internet connection.

It is yet another object of the present invention to provide summary graphical information of search engine or other URL list results with such a reduced image accompanied by an image map providing access to the hyperlinks present on the web page corresponding to the URL.

These and other objects and advantages of the present invention will be apparent from a review of the following specification and accompanying drawings.

DESCRIPTION OF THE PREFERRED EMBODIMENT(S)

The detailed description set forth below in connection with the appended drawings is intended as a description of a presently preferred embodiment of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequence may be accomplished by different embodiments that are also intended to be encompassed within the spirit and scope of the invention.

As shown in the figures, the present invention resides in an efficient and user-friendly process by which summary information is made readily available to the end user regarding worldwide web (web) pages on the Internet. In this way, a greater quantity of web page information can be perused or scanned in order to determine which web pages are of interest to the user. This maximizes the users' time and allows them to more fully exploit the advantages of the web as less time is spent waiting for pages to load and in the evaluation process. In general, the format of a web page can indicate its contents to a certain degree, and by summarily presenting the web page, the user is able to more readily find those web pages of interest. Additionally, web pages having no content or that have expired (such as those returning a "404" error) are readily discriminated and can be ignored without having to take the time to download the entire page.

Figure 1:
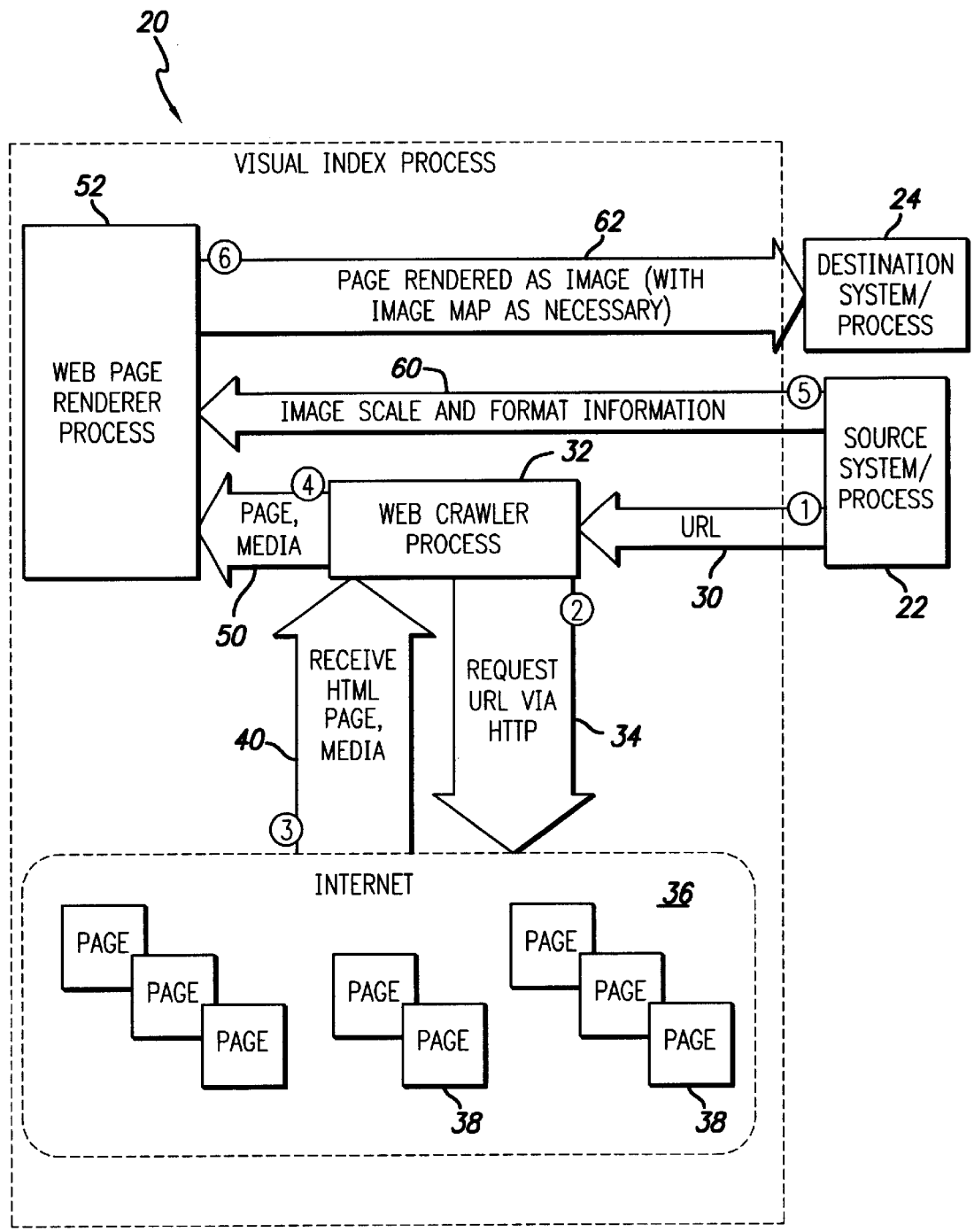
FIG. 1 is a diagram of the graphical search engine visual index method and process of the present invention.
Figure 2:
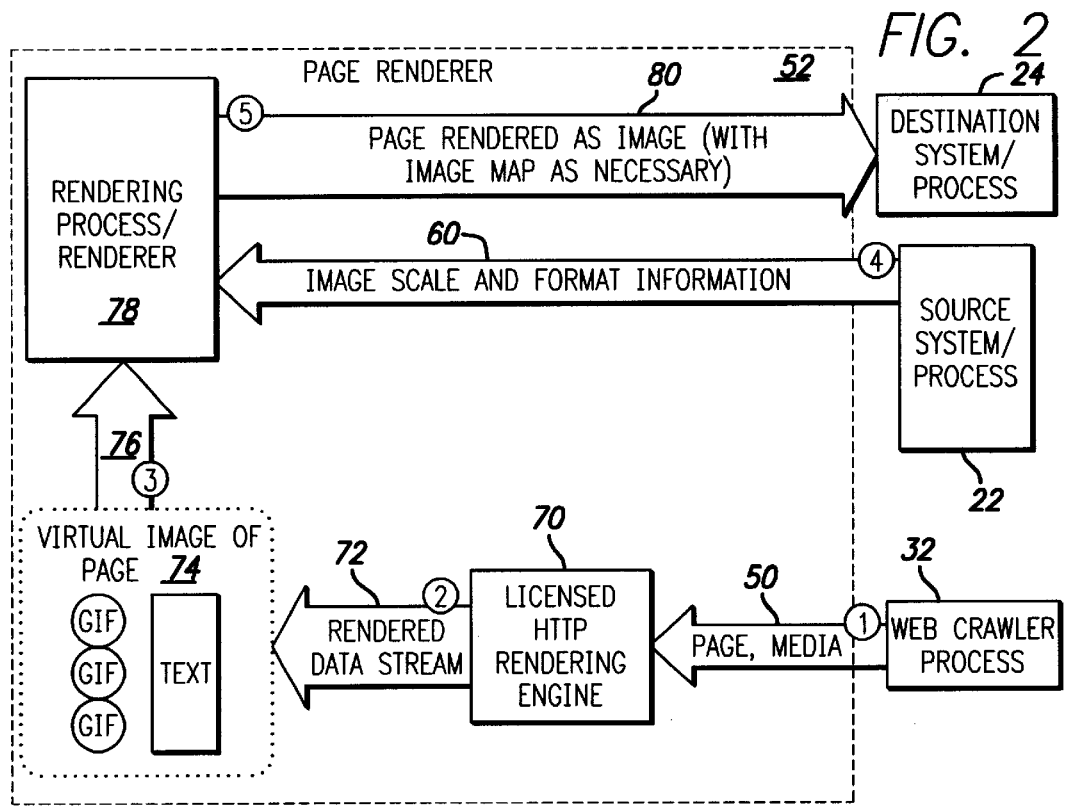
FIG. 2 is a diagram of the web page renderer of the present invention.

FIG. 1 shows a general schematic of the Graphical Search Engine Visual Index Method of the present invention. The visual index method 20 of the present invention takes its input information from a source system/process 22 and returns it to a destination system or process 24. The general sequence of steps of the method are indicated by the highlighted numbers as shown in FIGS. 1 and 2. The present invention allows for a variety of alternative embodiments all encompassed within the scope of the present invention.

The source system/process 22 is generally contemplated as being an Internet search engine such as ALTAVISTA, LYCOS, INFOSEEK, EXCITE, and the like. Hierarchical indices such as YAHOO! could also be used to good effect as providing the appropriate uniform/universal resource locator (URL) information required as a starting point for the present invention. As used herein for purposes of description, the source system/process 22 includes any delivered list of URLs for retrieval and graphical summarizing as rendered by the visual index method 20 of the present invention. As an alternative to search engines accessing the Internet as a whole, search engines accessing URLs present on an intranet separate and apart, or collateral to, the Internet are also contemplated within the scope of the present invention.

For descriptive purposes, examples and explanation regarding search engines are used herein. However, these should be understood as encompassing all sources of URLs, including URL databases or lists, whether or not such URLs are actively or passively requested and/or delivered. Additionally, references herein to the Internet encompass all computer networks using URL-type resource descriptors or which are otherwise subject to browsing. The vocabulary used to describe the features, steps, and operation of the present invention is understood as providing an ample description of the present technology. As computer and electronic resources develop on a local and global basis, the concepts and foundations of the present invention may be subject to changing technical terms in the art. Developing technical vocabulary shall not change the applicability of the present invention to developing and emerging arts and sciences.

In the present invention, the source system/process 22 delivers the URLs 30 to the visual index web crawler process or procedure 32. The URLs 30 are generally strings of locations often under 256 characters long that indicate resources available on the associated Internet, computer network, or otherwise. The visual index method web crawler process 32 requests from the Internet the delivered URLs 30 via hypertext transfer protocol (HTTP) as is normal for web browsing under current practices. The web crawler process 32 submits the request 34 for the information associated with the URLs 30 to the Internet/worldwide web 36.

In FIG. 1, the information associated with the URLs 30 is represented by a variety of web pages 38 which are retrieved and transmitted by the Internet 36 and delivered 40 to the visual index method web crawler process 32. Having retrieved the web page data/information/media 38 associated with the URLs 30, the visual index method web crawler process 32 then passes the information 50 to the visual index method page rendering process 52.

It should be noted that in fetching and transmitting the web page information 38 to the visual index method page rendering process 52, that the web crawler process 32 may recognize the type of information 38 associated with the URLs 30. Occasionally, URLs point to data streams or other media (such as video, audio, or MIDI) information. Generally, such data streams are not capable of being visually summarized. However, once the web crawler process 32 recognizes, determines, or detects the type of information presented (or the inability to determine such information), a token or other identifier can be passed in the transmitted information 50 to the page rendering process 52. A graphic image can then be posted along with the web page data 38 indicating the data stream and, alternatively, its type and/or other collateral information.

The web crawler process 32 also retrieves hyperlink, media, and other information embedded in the web pages as the information associated with the URL. In so doing, the web crawler process 32 provides information similar to that available to the user had the URL 30 been accessed by a browser independently of the visual index method 20 of the present invention.

After receiving the URLs (with their associated media) 40, the web crawler process 32 passes the information to the renderer 52 so that the graphic web page summary can be prepared and transmitted to the destination system/process 24. Upon receiving the data associated with the web pages 38 from the web crawler 32, the web page rendering process 52 also receives image scale and format information 60 indicating the general desired format for presentation in the destination system/process 24 of the web page information 38. Receipt of the image scale and format information 60 may be contemporaneous with the receipt of the page and media information 50 from the web crawler process 32. Upon receiving both the image scale and format information 60 from the source system/process 22 and the web page data, links, and associated media 50 from the web crawler process 32, the web page rendering process 52 is then able to fashion a rendered image for the destination source system/process 24. The web page rendering process 52 may optionally also provide an image map indicating media area and/or hyperlinks associated with the web page data 38 as rendered by the page rendering process 52.

The web page rendering process 52 holds either as a default or as a user-selected parameter information regarding the preferred scale to which the web page data 50 is to be rendered. Upon reformatting and rescaling the web page data 50, the web page rendering process 52 transmits the rendered web page or pages 62 as output to the destination system/process 24. The destination system/process 24 then makes available the rendered information to the user.

FIG. 2 shows one embodiment of the web page renderer/rendering process 52. In receiving the web page 50, the renderer 52 may first process the incoming data stream 50 via a licensed web document rendering engine 70 as is known in the art. Such rendering engines may include: web document or HTML rendering engines developed and/or licensed from companies such as Netscape Communications Corporation or Spyglass Corporation. Such commercial entities have web presences at the respective URLs: http://www.mozilla.org and http://www.spyglass.com. The HTML rendering engine 70 renders the incoming web page/media data stream 50 into a virtual image of the web page in memory. Such memory may include cache memory, disk drive memory or the like. The form of the memory is secondary to the actual storage of the rendered data stream 72 as transmitted by the HTML rendering engine 70.

Once a virtual image 74 of the web page is created in memory, the information is retrieved 76 for rendering and scaling by the scaling process 78. The rendering process takes the image scale and format information 60 received from the source system/process 22 and scales the virtual image of the page 74 to the size and shape indicated by the default or user preferences. Additionally, the rendering process 78 can selectively detect and select those hyperlinks or other links resident within the virtual image of page 74 according to the image, scale and format information 60. If the space occupied by the link or indicator in the virtual image of the web page 74 is of sufficient size, the rendering process 78 can then maintain the links present in the rendered image 80 when transmitted as output to the destination system/process 24.

When evaluating the virtual image of the web page 74, the rendering process 78 may form an image map, or HTML image map, that indicates the size of the web page as well as the size and position of the links inside of it. If the image scale and format information indicates that the size and position of the rendered web page 80 is too small to sufficiently make individual or other links inside the virtual image of the web page 74 readable and available to the user, such links may be selectively omitted from the image map.

Alternatively, if the user changes the size of the rendered image, the rendering process 70 may re-evaluate the image map and the rendered image according to the new parameters associated with the rendered web page. The user can then resize the rendered page if links are desired but are too small to designate. The rendered web page size and disposition is generally achieved in the same manner as windows are manipulated and fashioned in operating systems such as those used on the Macintosh® computer (manufactured by Apple Computer, Inc.) or as performed under operating systems similar to Windows® (created and distributed by Microsoft Corporation).

This omission of an image map is advantageous when only small representations of graphical web page information are needed as the links may be omitted from the rendered page output 80. Alternatively, when such information is advantageous, the user may select the option of having an image map with the rendered web page graphic, thus enabling hyperlinks.

Once the rendering process 78 has transmitted the rendered web page 80 to the destination system/process, it can then be reviewed by the user who may choose to select or bypass the web page. The user may select the web page by clicking on its rendered image as, preferably, a hyperlink is associated with the rendered image, namely the URL associated with the location of the original of the web page 38 retrieved by the web crawler process 32.

Figure 4:
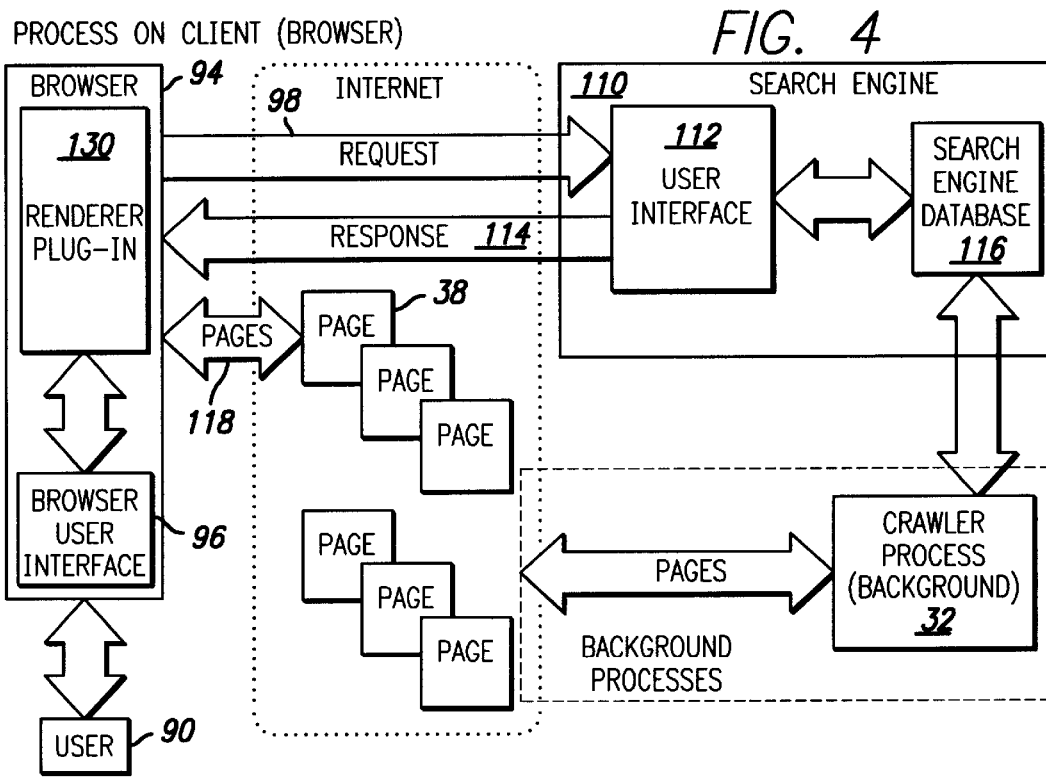
FIG. 4 is a diagram of software architecture of the visual index method of the present invention with part of the process resident on the client/browser.
Figure 3:
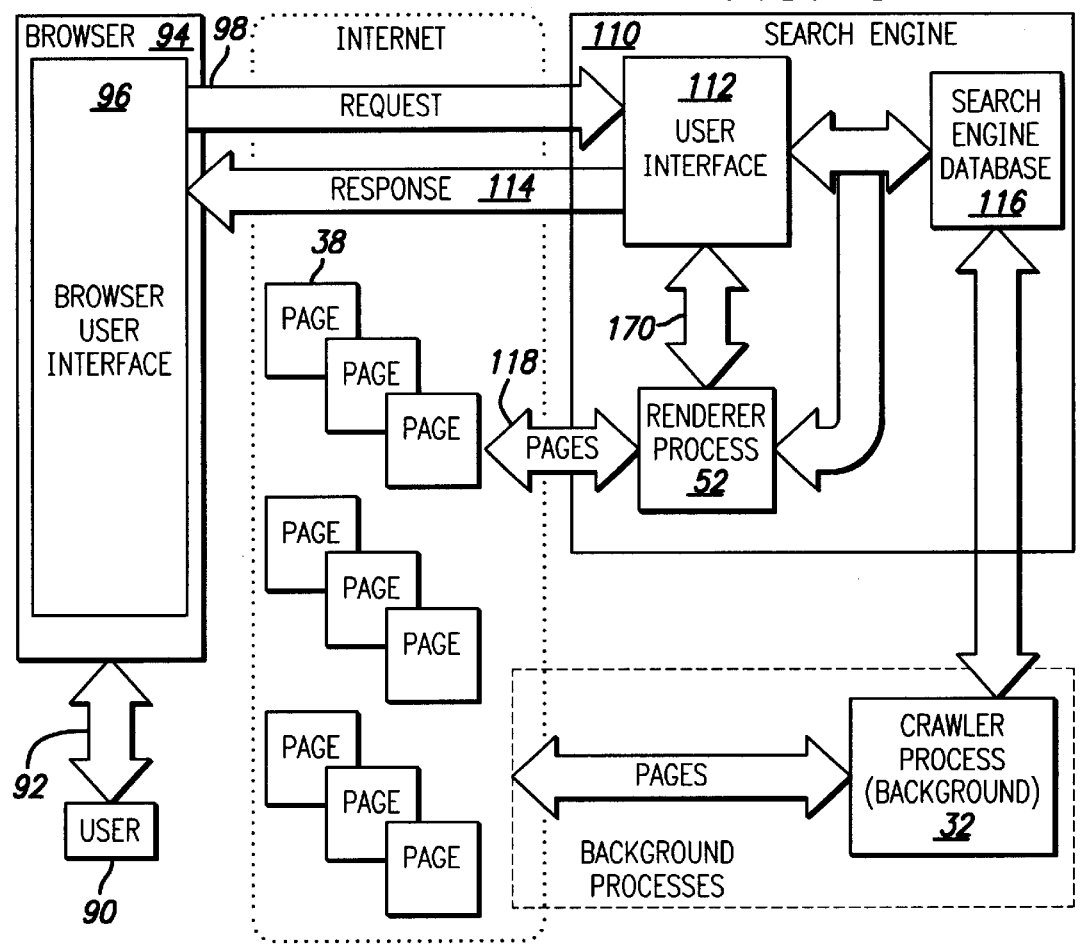
FIG. 3 is a diagram showing software architecture with the visual index method of the present invention resident on a server.

Having set forth generally the operation, construction, and architecture of the visual index method of the present invention, other alternative embodiments exist whereby distributed or localized processing may occur in order to achieve the present invention. FIGS. 3 and 4 show alternative embodiments of the visual index method 20 of the present invention where the rendering process is associated with or inherent to the server transmitting web information to the user (FIG. 3) or where the rendering process is associated with the browser or client side of the Internet connection established by the user to the Internet (FIG. 4).

In FIG. 3, the visual index method 20 of the present invention is present on the server. In this case, the visual index method 52 is associated with the search engine and acts in conjunction with the user interface associated with the search engine. The web crawler 32 may be allocated as a background process that retrieves the web page information for ultimate transmission to the visual index method page renderer 52.

As shown in FIG. 3, the user 90 requests and receives information 92 from a browser 94 having a browser interface 96. The user 90 makes the search engine request 98 via the browser user interface 96 to the search engine 110.

The search engine 110 generally includes its own user interface 112 that provides formatted output to the browser user interface 96 when a response or reply 114 is delivered from the search engine 110 back to the browser user interface 96. The search engine response may be determined predominately or in significant part by the visual index method page rendering process 52 that is associated with both the search engine user interface 112 and search engine data base 116. The visual index method web crawler process 32 is operated in the background and serves to either search the web for the available connections and resources, or by executing upon a list of URLs. Such URLs may be provided by the search engine data base 116. Alternatively, the web crawler process 32 may supply URL information to the search engine data base 116 so that results of the search request may be more readily supplied to the user 90.

When a search engine request 98 is made by the user 90, the search engine interface 112 may parse the request and pass it to the search engine data base 116. The search engine data base may either or both rely upon its list of URLs with summary information and/or make request of the web crawler process 32 that a web search be performed. The web crawler process 32 retrieves the data associated with the URLs either as a result of the separate web crawler search or from the search engine data base 116. The web crawler process 32 can then pass the associated media and URL information to the visual index method page renderer process 52 via the search engine data base 116 or otherwise. The user interface 112 can also pass the image scale and format information to the web page renderer 52. Upon appropriately completing its rendering process, the page renderer 52 can then pass the rendered pages as output 120 to the search engine user interface 112. Image maps (as set forth above) may also be included with the rendered images.

The search engine user interface 112 then transmits the formatted and rendered web pages 38 in its response 114 to the browser user interface 96 and ultimately to the user 90.

In FIG. 4, the visual index method 20 of the present invention is shown distributed between the Internet server and the browser 94 local to the user 90. The user 90 makes a search engine request to the search engine 110 via a browser 94 with a user interface 96 either together or in conjunction with a visual index method plug-in 130 that corresponds to the visual index method page renderer 52.

In the art, such software plug-ins are commonplace and arise naturally when access is sought of certain data or other files (such as audio or video data streams) that the browser 94 may not be able to handle inherently. The data stream may indicate to the browser 94 the plug-in which, in conjunction with the browser 94, allows the data stream to be read.

The request 98 is made via the browser 94 to the search engine user interface 112. The request is then parsed by the user interface and passed to the search engine data base 116. The search engine data base may operate in conjunction with a background web crawler process 32 much in the same way that the data base 116 and crawler 32 operated when the visual index method 20 of the present invention is located on the server (FIG. 3). The web crawler process 32 fetches Internet web pages 38 according to a list of URLs transmitted to it. The data associated with the web pages is then transmitted back to the search engine 110 and to the visual index method plug-in 130 as output 114 from the search engine 110. The visual index method plug-in 130 may obtain image scale and format information via the search engine output response 114 or by a specific request and reception 118 of such information from the web pages 38 associated with the corresponding URLs. The visual index method plug-in 130 then renders the web pages as set forth above so that summary graphic information, as well as optional HTML image maps, are rendered as output to the user 90 via the browser user interface 96.

Having set forth the visual index method 20 of the present invention, an additional alternative embodiment exists where the user 90 is not separated from the search engine 110. In such a case, the user 90 is generally operating on a system directly connected to the Internet and such an alternative embodiment would operate similarly to the ways and methods set forth above for the visual index method.

Figure 5:
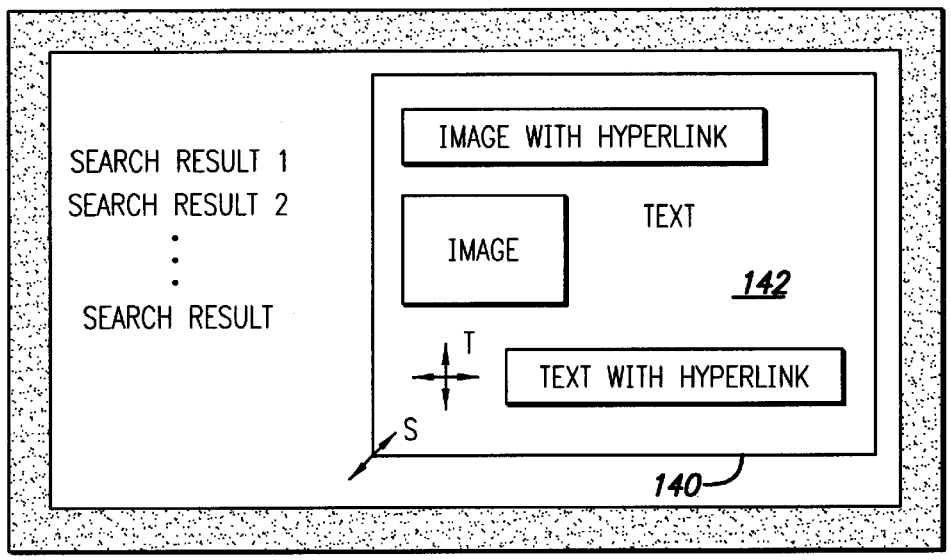
FIG. 5 is an example of an alternative embodiment of the screen output from the is visual index method of the present invention.
Figure 6:
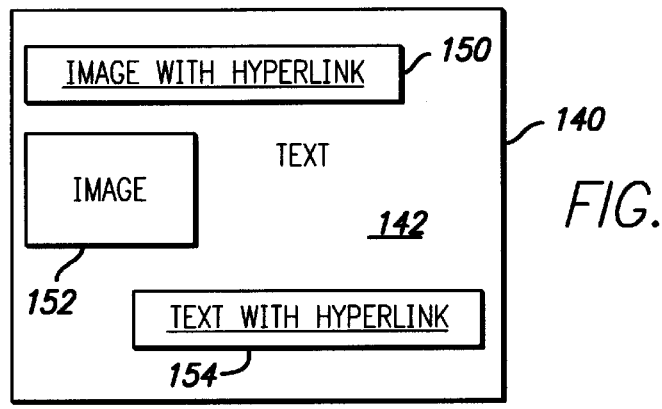
FIG. 6 is a closeup of a dedicated graphical screen section of the screen output shown in FIG. 5.

In order to provide more convenient perusal or review of the results of the Internet search or other URL listing, three presentation formats are shown in FIGS. 5–8. FIGS. 5 and 6 show a first format where a dedicated graphical swing area 140 is provided in one part of the computer screen. In FIG. 5, this part of the screen is shown as being the right half of the computer screen. The left side of the screen provides a sorted or ordered list of hyperlinks corresponding with the rendered web page shown in the dedicated graphical screen area 140. Due to the flexibility of graphical programming and the like, the elements in this first format may be shifted about the screen with relative ease. For example, the graphical screen area 140 may be resized or moved in real time using a mouse according to the preferences of the user as indicated by the double-headed arrow S and the cross T, respectively.

In one embodiment, the format shown in FIGS. 5 and 6 provides rendered web pages 142 when the user passes the cursor over the corresponding hyperlink set forth on the left hand side of the page. When the cursor passes to another hyperlink, the rendered web page 142 associated with that hyperlink is then displayed. In very quick order, the user is able to scan graphical summaries of each of the hyperlinks presented on the computer screen. An additional hyperlink (not shown) can present to the user additional hyperlink lists corresponding to additional rendered web pages 142.

Exhibits 1–4, attach as appendices, provide source code for achieving a variety of output formats. Each may be used according to user preferences. The specific links and rendered pages may be supplied by the visual index method of the present invention. Additional links with their rendered pages can be added in a cumulative manner using the chosen source code as a template.

It is possible to use JavaScript code for navigating through web pages. For example, using JavaScript, a user could put his mouse over a link and a new window would appear on the user's desktop showing the page referred to by that link. Also, a user could put his mouse over a link and the contents of a frame in his browser window would change, loading the document referred to by that link. Exhibits 3 and 4 demonstrate such aspects of JavaScript.

The present invention provides additional advantages to either of these two schemes, or others developed along these lines. First, the present invention enables the previewing of pages, while the other methods do not. The present invention renders a web page (or other) image and presents it in an ergonomic fashion to the user. The other methods simply navigate to the web page, bypassing any preview functionality.

Second, the present invention provides a user with the ability to view multiple rendered pages at once, allowing the user to elect to navigate to a page based on the appearance of that page juxtaposed to the other rendered pages referred to on that page. The other methods simply navigate to one page serially, and provide the user with no opportunity to compare web pages simultaneously.

As shown in FIG. 6, the dedicated graphical screen area 140 showing the rendered web page 142 may be resizable and movable as with any other window common in graphical user interfaces. Images with hyperlinks 150, mere images 152, text with hyperlinks 154, or other features commonly associated with web pages 38 may be presented in the rendered web page 142. When an image map is associated with a rendered web page 142, the user is transported to the hyperlink's destination when the hyperlink is designated by a mouse as by clicking or otherwise. If the image map were not present, merely clicking upon the hyperlink might have no response or might transport the user to the web page resident at the original URL. Where an image map is present, clicking upon the rendered web page 142 anywhere other than a hyperlink may transport the user to the site of the original URL. Known features such as tooltips may be associated with embedded hyperlinks. Icon, link, and other feature control and access may be obtained by clicking with the right hand mouse button as is known in the art.

Figure 7:
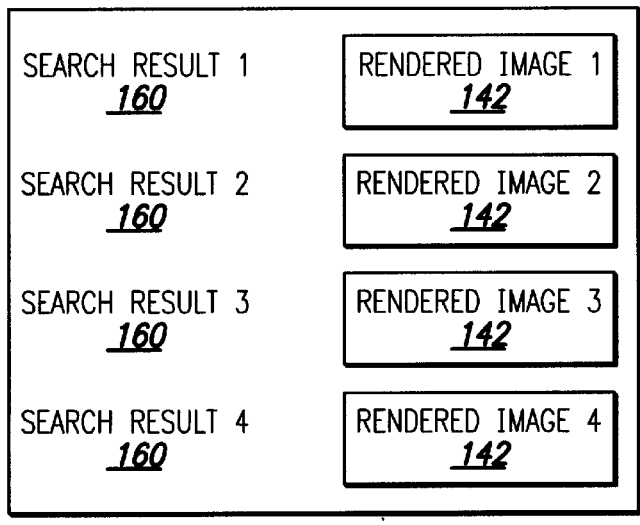
FIG. 7 is an alternative embodiment of the output of the visual index method of the present invention formatted for a computer screen.

FIG. 7 shows an alternative embodiment of the presentation format that may be advantageously used in conjunction with the visual index method 20 of the present invention.

In FIG. 7, the hyperlink search results 160 may all be listed on the left hand side of the screen. The rendered web pages 142 can be presented opposite the search results or other hyperlinks 160 on the corresponding right hand side of the computer screen 162. The user may either click upon the hyperlink in order to access the web page graphically summarized by the rendered image 142 or, alternatively click upon the rendered image 142 to be transported to that site. If an image map is associated with the rendered image 142, then clicking upon different areas of the rendered image 142 will have the same results as those set forth in the description of FIG. 6, above. Areas of the rendered image 142 with hyperlinks fetch the information or transport the user to the site associated with the hyperlink. Clicking upon a rendered image in an area not designated as a hyperlink fetches the information/transports the user to the site of the original URL from the which the rendered image 142 was derived. The computer screen 162 may be scrollable either vertically or horizontally according to the preferences of the user or software programmer. The rendered images may also be resized or moved about the computer screen as desired.

Figure 8:
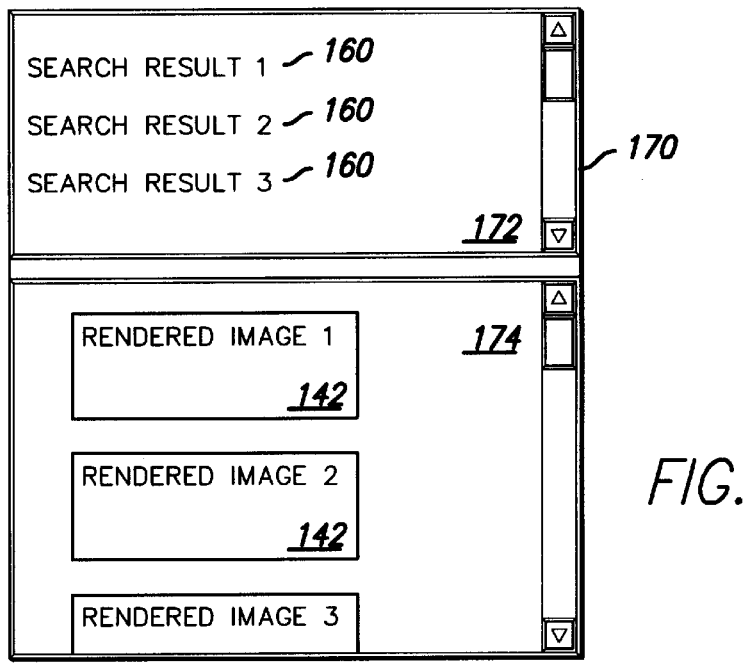
FIG. 8 is an alternative embodiment of output from the visual index method of the present invention formatted for a computer screen.

FIG. 8 shows a framed display presentation format where the computer screen 170 is split into two frames: an upper search results hyperlink frame 172 and a lower rendered-image graphical summary frame 174. Search results or other hyperlinks 160 may be shown in the upper frame 172 while reduced images of the corresponding web pages 142 can be shown at a lower frame 174. By passing the cursor over different ones of the list of the hyperlinks in the upper frame 172, the corresponding reduced image may be presented in the lower frame 174, highlighted, or otherwise indicated.

Alternatively, the rendered images may all be presented simultaneously or contemporaneously in the lower frame. Scrolling the lower frame vertically would allow the user to survey the results. Additionally, placing the cursor over a hyperlink in the upper window could cause the associated web page to appear in the lower window.

The relative positioning of the frames may be altered according to user preferences such that the frames may be reversed with the reduced images on the top and the hyperlinks at the bottom or either of the two available side-by-side configurations. As before with the other prior two presentation formats, designation by clicking upon the reduced images with the mouse may access the original URL site or the associated hyperlink if an image map is associated with the rendered image.

Throughout the present invention, presentation of graphical images and the like, including rendered images representing web pages as provided by the present invention, can be subject to resizing and moving according to user preferences. Consequently, the conveniences and preferences of the ultimate end user can be accommodated, making use of the present invention more advantageous.

By providing the visual index method of the present invention, vast amounts of graphical data can be perused by a user much faster than by previously available methods or means. Prior to the present invention, web pages had to be called up one by one, each web page filling the entire screen and without the availability of quick inspection. With the present invention, the user is freed from having to dedicate his monitor or other visual/video transmission device in order to review the results of an Internet search. Consequently, it becomes much easier to determine which web pages would be of most interest to the user, making the Internet even more advantageous than before and making worldwide web browsing or web "surfing" easier and more useful, even for the novice. By providing more efficient means by which web pages can be reviewed, compared, and printed, the present invention enhances the ability of the Internet.

Certain advantages arise from the use of the present invention. As is known in the art, junk or bogus electronic information is often circulated on the Internet. The term of art used to describe such unwanted messages or information is "spam." The present invention provides some benefits in order to defeat "spam." Sites frequently spam search engines by loading a web page with a large number of invisible words that make a search engine think a page is about a given subject in order to attract web traffic. Once visited, the user realizes the deception as the page has a "bait and switch" approach in that the page has nothing to do with, for example, McDonald's hamburger restaurants, as it is actually an animal rights page preaching against beef. In the present invention, such invisible words could be detected and or filtered to flag the fact that a web page has an inordinate number of diverse and/or unrelated tag words.

While the present invention has been described with regards to particular embodiments, it is recognized that additional variations of the present invention may be devised without departing from the inventive concept. For example, the rendered images 142 may be presented in scrollable (both horizontally and vertically) dedicated graphical screen areas 140 so that rendered web page data may be presented in a limited space while maintaining the scrollability feature often present with such web pages when accessed directly. Additionally, the present invention allows easy discernment and detection of unavailable or expired web pages. Such web pages often generate what are known as "404" errors indicating that no web page exists at a URL. Such "404" errors generally have a well-recognized format that can easily be discriminated even though the image presenting the error information has been reduced. Additionally, the web crawler process 32 could be incorporated into the page renderer 52 if programming efficiencies or other optimizations occurred.

What is claimed is:

1. A browser interface for rendering summary graphic information regarding at least one Uniform/Universal Resource Locator (URL), comprising:
   a web crawler, said web crawler receiving a first URL from a source of URLs, said web crawler retrieving data associated with said first URL and transmitting said data as output; and
   a web page renderer, said web page renderer receiving as input said retrieved data associated with said first URL transmitted as output by said web crawler, said web page renderer also receiving as input image scale and format information, said web page renderer transmitting as output a reduced image of said data associated with said first URL, said web page renderer transmitting said reduced image with an embedded hyperlink embedded in said data and referring to a second URL separate from said first URL with which said data is associated; whereby
   the browser interface delivers to a viewer said reduced image as a graphical summary of said data, allowing said viewer to more easily determine content presented at said URL without having said data occupy an entire computer screen.

2. A browser interface for rendering summary graphic information regarding at least one Uniform/Universal Resource Locator (URL), comprising:
   a web crawler, said web crawler receiving a first URL from a source of URLs, said web crawler retrieving data associated with said first URL and transmitting said data as output; and
   a web page renderer, said web page renderer receiving as input said retrieved data associated with said first URL transmitted as output by said web crawler, said web page renderer also receiving as input image scale and format information, said web page renderer transmitting as output a reduced image of said data associated with said first URL, said web page renderer transmitting said reduced image with an embedded hyperlink, said embedded hyperlink including an embedded hyperlink carried by an image map having clickable, or mouse-designatable, areas of said reduced image corresponding to similar areas of said data associated with said first URL; whereby
   the browser interface delivers to a viewer said reduced image as a graphical summary of said data, allowing said viewer to more easily determine content presented at said URL without having said data occupy an entire computer screen.

3. The browser interface of claim 2, wherein said clickable areas further comprise hyperlinks.

4. The browser interface of claim 2, wherein said image map further comprises:
   an image map obtained by:
      rendering a virtual image of said retrieved data in memory;
      identifying areas in said virtual image of sufficient size to be reasonably representable and available to said viewer;
      scaling said virtual image according to said image scale and format information;
      determining coordinates of said identified areas and scaling said identified areas according to said scaling of said virtual image;
      storing said determined coordinates in said image map in association with said reduced image; and
      storing linking URL information related to said identified areas in association with said reduced image; whereby
   said reduced image maintains clickable hyperlinks in a manner similar to that of said retrieved data despite reduced size of said reduced image.

5. The browser interface of claim 4, wherein said virtual image is a high resolution abstraction of said retrieved data as it would normally be presented to a viewer.

6. The browser interface of claim 1, wherein said output of said web page renderer further comprises:
   a hyperlink list having a first number hyperlinks;
   a set of reduced images generated by said web page renderer; and
   a one-to-one association of said hyperlinks with said reduced images; whereby
   when a cursor or mouse pointer overlays a hyperlink in said hyperlink list, a graphical screen space displays an associated reduced image such that at any one time, only one reduced image is displayed in said graphical screen space.

7. A browser interface for rendering summary graphic information regarding at least one Uniform/Universal Resource Locator (URL), comprising:
   a source of URLs, said source of URLs selected from the group consisting of local Internet search engines, remote Internet search engines, and databases;
   a web crawler, said web crawler receiving a first URL from said source of URLs, said web crawler retrieving data associated with said first URL, including all associated visible media associated with said first URL if said first URL points to a page, and transmitting said data as output; and
   a web page renderer, said web page renderer receiving as input said retrieved data associated with said first URL transmitted as output by said web crawler, said web page renderer also receiving as input image scale and format information from said source of URLs, said web page renderer transmitting as output a reduced image of said data associated with said first URL, said web page renderer transmitting said reduced image with an embedded hyperlink to said first URL, said embedded hyperlink including a hyperlink embedded in said data referring to a second URL separate from said first URL with which said data is associated; whereby
   the browser interface delivers to a viewer said reduced image as a graphical summary of said data, allowing said viewer to more easily determine content presented at said URL without having said data occupy an entire computer screen and allowing said view to more quickly review such data.

8. A browser interface for rendering summary graphic information regarding at least one Uniform/Universal Resource Locator (URL), comprising:
   a source of URLs, said source of URLs selected from the group consisting of local Internet search engines, remote Internet search engines, and databases;
   a web crawler, said web crawler receiving a first URL from said source of URLs, said web crawler retrieving data associated with said first URL, including all associated visible media associated with said first URL if said first URL points to a page, and transmitting said data as output; and
   a web page renderer, said web page renderer receiving as input said retrieved data associated with said first URL transmitted as output by said web crawler, said web page renderer also receiving as input image scale and format information from said source of URLs, said web page renderer transmitting as output a reduced image of said data associated with said first URL, said web page renderer transmitting said reduced image with an embedded hyperlink to said first URL, said embedded hyperlink including an embedded hyperlink carried by an image map having clickable, or mouse-designatable, areas of said reduced image corresponding to similar areas of said data associated with said first URL; whereby
   the browser interface delivers to a viewer said reduced image as a graphical summary of said data, allowing said viewer to more easily determine content presented at said URL without having said data occupy an entire computer screen and allowing said view to more quickly review such data.

9. The browser interface of claim 8, wherein said clickable areas further comprise hyperlinks.

10. The browser interface of claim 8, wherein said image map further comprises:
   an image map obtained by:
      rendering a virtual image of said retrieved data in memory;
      identifying areas in said virtual image of sufficient size to be reasonably representable and available to said viewer;
      scaling said virtual image according to said image scale and format information;
      determining coordinates of said identified areas and scaling said identified areas according to said scaling of said virtual image;
      storing said determined coordinates in said image map in association with said reduced image; and
      storing linking URL information related to said identified areas in association with said reduced image; whereby
   said reduced image maintains clickable hyperlinks in a manner similar to that of said retrieved data despite reduced size of said reduced image.

11. The browser interface of claim 10, wherein said virtual image is a high resolution abstraction of said retrieved data as it would normally be presented to a viewer.

12. A browser interface for rendering summary graphic information regarding at least one Uniform/Universal Resource Locator (URL), comprising:
   a source of URLs, said source of URLs selected from the group consisting of local Internet search engines, remote Internet search engines, and databases;
   a web crawler, said web crawler receiving a first URL from said source of URLs, said web crawler retrieving data associated with said first URL, including all associated visible media associated with said first URL if said first URL points to a page, and transmitting said data as output; and
   a web page renderer, said web page renderer receiving as input said retrieved data associated with said first URL transmitted as output by said web crawler, said web page renderer also receiving as input image scale and format information from said source of URLs, said web page renderer transmitting as output a reduced image of said data associated with said first URL, said web page renderer transmitting said reduced image with an embedded hyperlink to said first URL;
   said output of said web page renderer including:
      i. a list of hyperlinks;
      ii. a set of reduced images generated by said web page renderer; and
      iii. a one-to-one association of said hyperlinks with said reduced images; whereby
      iv. when a cursor overlays a hyperlink in said hyperlink list, a dedicated graphical screen space displays an associated reduced image such that at any one time, only one reduced image is displayed in said graphical screen space; whereby
   the browser interface delivers to a viewer said reduced image as a graphical summary of said data, allowing said viewer to more easily determine content presented at said URL without having said data occupy an entire computer screen and allowing said view to more quickly review such data.

13. A method for summarizing web data content, the steps comprising:
   receiving a first Uniform/Universal Resource Locator (URL);
   retrieving data associated with said first URL;
   obtaining image scale and format information for said first URL data;
   scaling said data according to said image scale and format information to render a reduced image generally resembling said data associated with said first URL;
   embedding or associating a hyperlink with said reduced image, including embedding a hyperlink to a second URL separate from said first URL; and
   transmitting said reduced image as output; whereby
   said reduced image provides a graphical and visual summary of said data associated with said first URL, allowing rapid and preliminary review of said data by a viewer.

14. A method for summarizing web data content, the steps comprising:
   receiving a first Uniform/Universal Resource Locator (URL);
   retrieving data associated with said first URL;
   obtaining image scale and format information for said first URL data;
   scaling said data according to said image scale and format information to render a reduced image generally resembling said data associated with said first URL;
   embedding or associating a hyperlink with said reduced image;
   creating an image map, including:
      i. rendering a virtual image of said retrieved data in memory;
      ii. identifying areas in said virtual image of sufficient size to be reasonably representable and available to said viewer;

iii. scaling said virtual image according to said image scale and format information;
iv. determining coordinates of said identified areas and scaling said identified areas according to said scaling of said virtual image;
v. storing said determined coordinates in said image map in association with said reduced image; and
vi. storing linking URL information related to said identified areas in association with said reduced image; whereby
vii. said reduced image maintains clickable, or mouse-designatable, hyperlinks in a manner similar to that of said retrieved data despite reduced size of said reduced image;

embedding said hyperlink in said image map; and
transmitting said reduced image as output; whereby
said reduced image provides a graphical and visual summary of said data associated with said first URL, allowing rapid and preliminary review of said data by a viewer.

15. The method for summarizing web data content of claim 14, wherein said step of rendering a virtual image of said retrieved data further comprises:
rendering a high resolution abstraction of said retrieved data as said retrieved data would normally be presented to a viewer accessing said first URL.

* * * * *